Feb. 26, 1935. J. R. OISHEI ET AL 1,992,628
COMBINATION ELECTRIC AND PNEUMATIC HORN
Filed Oct. 3, 1930

Inventors
John R. Oishei
Henry Hueber
By Barton A. Bean Jr.
Attorney

Patented Feb. 26, 1935

1,992,628

UNITED STATES PATENT OFFICE 1,992,628

COMBINATION ELECTRIC AND PNEUMATIC HORN

John R. Oishei and Henry Hueber, Buffalo, N. Y., assignors to Trico Products Corporation, Buffalo, N. Y.

Application October 3, 1930, Serial No. 486,226

7 Claims. (Cl. 177—7)

This invention relates to a horn adapted for use on motor vehicles, boats and other places where a warning signal is desired to be given.

The electric horn such as is used on motor vehicles has placed an additional burden on the battery, and for certain reasons has been replaced by the fluid pressure operated horn but the latter has necessitated the use of special equipment and apparatus to build up the desired operating pressure. Other air signals and horns have been operated by fluid pressure such as that derived from the internal combustion engine of the motor vehicle but in the latter instance the fluid pressure is only available when the engine is operating.

The operation of a fluid pressure signal independent of the storage battery on a vehicle conserves the electrical energy and also enables the production of a warning note which is particularly desired. Therefore, such a horn is desirable but is restricted to usage only during engine operation, unless special pressure generating apparatus is provided.

The present invention has for its object to provide a horn operable normally by fluid pressure, such as that derived from the motor vehicle engine, but, in the absence of that source of supply, capable also to operate electrically whereby under normal conditions the horn may be operated by fluid pressure so as to obtain the advantages of such method of operation and when the pressure is inadequate then the electrical actuation is present to be called into play when the demand is made therefor.

The invention further resides in simplifying the construction so that the pneumatic and electric units are so combined as to provide a compact unit with the vibratory member or sound wave generator being common to both the pneumatic and electric phases of the horn.

The invention will further be found to reside in the salient features of construction and arrangements and combinations of parts hereinafter described and claimed, reference being had to the accompanying drawing wherein:—

Figure 1:
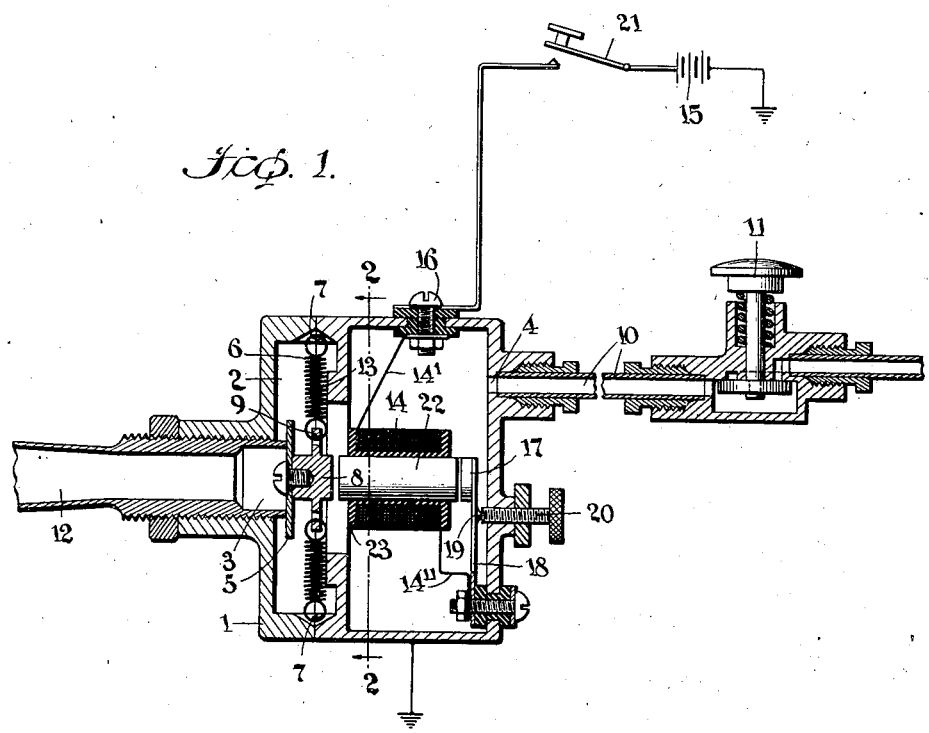
Fig. 1 is a sectional view through a horn embodying the present invention.
Figure 2:
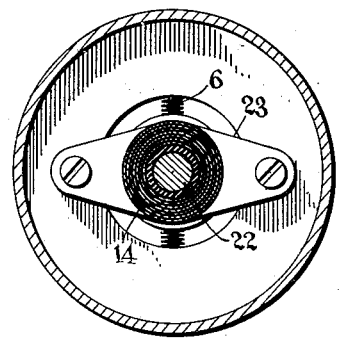
Fig. 2 is a transverse sectional view therethrough taken on about line 2—2 of Fig. 1.

Referring more in detail to the accompanying drawing the numeral 1 designates a casing having a chamber 2 into which opens an inlet port 3 and from which leads an outlet port 4. One of these ports, in the present instance the inlet port 3, is normally closed by a sound wave generator 5 which is resiliently held seated over the port 3 to close the same, the resilient support for the vibratory member or valve 5 being herein depicted as comprising a plurality of springs 6 connected at their inner ends to the vibratory member and extending radially therefrom for being anchored to the surrounding wall of the chamber 2, as indicated at 7. The vibratory member may be provided with a hub or stem 8 from which extends a flange 9 to provide a convenient means of attachment for the inner ends of the springs.

The outlet 4 is connected by a conduit 10, having a control valve 11 therein, to a source of fluid pressure which in the present instance is subatmospheric such as that induced in the intake manifold of the internal combustion engine. Therefore, when the valve 11 is opened a rarefaction or reduced pressure will exist in the chamber 2 permitting the external atmospheric pressure, within the trumpet part 12 of the horn, to push the vibratory member 5 from its seat against the tension of the springs 6, causing the chamber pressure to rise and permit the springs to again seat the vibratory member 5. This valve action of the vibratory member, seating and unseating will set up sound waves in the air stream passing through the chamber 2, which sound waves or pulsations will be modified by the trumpet 12 and sound the warning note through the bell part of the trumpet. The springs 6 are given intermediate support by an annular ring 13, this general arrangement forming the subject matter of a co-pending application.

Now should the suction maintaining in the intake manifold of the motor vehicle engine be insufficient to vibrate the valve or vibratory member 5, or should the engine be at rest, then in accordance with the present invention other means are provided for setting the member 5 in vibration so as to produce the audible signals. In the present disclosure this means is shown as comprising an electromagnet 14 arranged in electric circuit with the battery 15 through the insulated binding post 16, the opposite side of the circuit being to the ground through a breaker device 17. The magnet is connected by wire 14' to post 16 and by a wire 14'' to the breaker device. This breaker device may consist merely of a spring arm 18 having a contact point 19 thereon normally closing circuit through an adjusting screw 20 which latter is grounded in the horn casing as is clearly shown in Fig. 1. Within this circuit is a control switch 21 so that when the latter is closed a circuit will be established through the solenoid 14 and the normally contacting parts 19 and 20, thereby energizing the magnet 14 to attract the breaker device 17 for separating the contact point 19 from the screw 20 and thereby breaking the electric circuit. Consequently, the magnet will be de-energized to release the previously attracted breaker device 17 for re-establishing the electric current so that re-energization of the magnet will ensue, and thus the magnet will intermittently become energized and de-energized in accordance with the vibratory action of the breaker device 17.

The electromagnet is conveniently arranged within the horn housing 1 and has its core 21 opposing the breaker device 17 at one end and the hub part 8 of the valve 5 at the opposite end. Consequently, when the electromagnet is energized the core 22, by becoming magnetized, will attract the breaker device toward it at one end and the hub 8 at the opposite end, and when the circuit is broken both parts 8 and 17 will be released and moved away from the core 22 to be subsequently attracted upon reenergization of the electromagnet. Therefore, the magnet will act to vibrate the member 5 and create the desired sound waves irrespective of the condition of the fluid pressure supply. The hub 8 constitutes an armature for the electromagnet and is responsive thereto. The electro-magnet may be supported as by means of the bridge piece 23 from the supporting ring 13, this arrangement providing a simple mounting by which the magnet is arranged co-axially with the hub 8.

During the normal operation of the internal combustion engine the valve or control 11 may be opened so as to establish communication between the horn and the intake manifold and thereby provide for a fluid pressure actuation of the member 5 in creating the warning signal; but when the engine is at rest the switch control 21 may be closed to energize the magnet and thereby produce the warning note. Consequently, the horn embodies within its housing, in compact arrangement, a sound producer capable of selective operation either through the instrumentality of fluid pressure or through an electric circuit. This selectivity in control and actuation may be facilitated by bringing the controls into a more readily accessible relationship and in fact the two controls can be embodied in a construction having a single, common manipulator, not herein shown.

The vibratory member 5 is common to both the pneumatic action and the electric action, serving in the former as a valve to interrupt the air stream and generate the sound waves, and in the latter as an armature for the electromagnet and to generate the sound waves.

What is claimed is:

1. A combined electric and fluid pressure operated horn comprising a chamber having an inlet port and an outlet port, a source of fluid operating pressure, a vibratory member within the chamber normally seating to close one port and adapted to be vibrated to produce sound pulsations when the chamber is connected to said source whereby an air stream is caused to move through the chamber from one to the other of said ports, an electromagnet housed within the chamber with its core disposed axially of the normally closed port and on the opposite side of the vibratory member therefrom, means for intermittently energizing and de-energizing the electromagnet for vibrating the vibratory member independently of the air stream, said electromagnet acting directly on said vibratory member, and means for selectively setting the vibratory member in operative vibration either by an air stream, independently of the electromagnet, or by the electromagnet independently of the air stream.

2. A horn for being operated pneumatically, as by the reduced pressure derived from the intake manifold of an operating internal combustion engine, comprising a chamber having fluid inlet and exhaust ports, the exhaust port being connectible to the source of reduced pressure, a vibratory member having intermittent valving engagement with the inlet port for interrupting the fluid flow therethrough, an armature carried by and movable with said vibratory member on the opposite side thereof from the valve engaging side, an electromagnet related to the armature for attracting the latter, means for intermittently energizing the magnet to vibrate said vibratory member for sounding the horn, and means operable independently of said first means for connecting said chamber to said source of reduced pressure for vibrating said vibratory member for sounding the horn independently of the magnetic operation thereof, whereby said horn may be sounded either as an electric horn or as a pneumatic horn in a selective manner.

3. A combination electric and pneumatic horn comprising a casing having a seat and a vibratory member normally and resiliently having valving engagement with the seat, a source of fluid operating pressure, means for causing an air stream to intermittently unseat the vibratory member for the production of sound, and electrical means operable magnetically on said vibratory member to intermittently unseat the vibratory member for the production of sound in the absence of such air stream, said electrical means being operable independently of said first means, and both means acting independently and selectively to effect a vibration of said vibratory member for sounding the horn.

4. A combination electric and suction operated horn, comprising a casing having an inlet opening to the atmosphere and an outlet connectible to a source of reduced pressure such as that derived from the intake manifold of an internal combustion engine, a seat about the inlet, a vibratory member engaged with the seat, resilient means tending to hold the member to the seat and yieldable upon the application of suction to the outlet, means for connecting the outlet to the source of reduced pressure, an armature connected to the vibratory member, and electromagnetic means for vibrating the armature when placed in a closed electric circuit to set said vibratory member in operation, said vibratory member being operable by the suction independently of the electromagnet.

5. A fluid pressure operated horn comprising a chamber having an inlet port and an outlet port, a vibratory member, a seat for said vibratory member, one of said ports opening through the seat, said vibratory member engageable with the seat to close the port therethrough and adapted to be vibrated on the seat to produce sound pulsations, means for connecting the chamber through one of said ports to a source of operating pressure to effect an air flow through the seat port to vibrate said vibratory member on the seat for the production of sound, and means independently of said first means and also independent of air flow through the seat port for vibrating said vibratory member on its seat for the production of sound, said two means being selectively operable independently of each other for individual operation of the same aforesaid vibratory member.

6. A combined electric and fluid pressure operated horn comprising a chamber having an inlet port and an outlet port, a source of fluid operating pressure, means for opening the chamber through one of said ports to said source of operating pressure, electrical means for operating a vibratory member electrically, and a sound producing vibratory member operable by each of said operating means independently of the other of said operating means, said electrical means acting on said vibratory member independently of any air flow actuation of the same.

7. A combined electric and fluid pressure operated horn comprising a chamber having an inlet port and an outlet port, a vibratory member within the chamber having a part normally closing one of said ports and adapted to be vibrated to produce pulsations in such port, a source of fluid operating pressure, means connecting the chamber to said source for effecting an air flow through the closed port to vibrate said vibratory member for the production of sound, an electromagnet means arranged to attract said vibratory member intermittently for effecting a sound producing vibratory movement thereof, said vibratory member constituting an armature for said electromagnetic means and being free thereof when the latter is inoperative whereby the vibratory member may be actuated by air flow.

JOHN R. OISHEI.
HENRY HUEBER.